United States Patent [19]

Dages

[11] Patent Number: 5,656,365
[45] Date of Patent: Aug. 12, 1997

[54] INTERMEDIATE FIRE-RESISTANT FILM AND ITS USE IN A LAMINATED GLASS

[75] Inventor: Daniel Dages, les Mureaux, France

[73] Assignee: Saint Gobain Vitrage, Courbevoie, France

[21] Appl. No.: 458,295

[22] Filed: Jun. 2, 1995

[30] Foreign Application Priority Data

Jun. 2, 1994 [FR] France .................. 94 06772

[51] Int. Cl.⁶ .............. B32B 7/12; B32B 17/10; C08L 61/02; E06B 3/66

[52] U.S. Cl. .......... 428/221; 525/398; 525/399; 525/401; 525/472; 525/474; 525/539; 525/540; 428/524

[58] Field of Search ................. 525/398, 399, 525/401, 472, 474, 539, 540; 428/221, 245, 246, 524

[56] References Cited

U.S. PATENT DOCUMENTS

| 5,187,217 | 2/1993 | Degilh et al. . | |
|---|---|---|---|
| 5,322,875 | 6/1994 | Dages . | |
| 5,364,703 | 11/1994 | Tracy | 428/460 |
| 5,415,942 | 5/1995 | Anderson | 428/447 |
| 5,447,902 | 9/1995 | Imai et al. | 503/227 |
| 5,478,412 | 12/1995 | Simon et al. | 428/142 |

*Primary Examiner*—Samuel A. Acquah
*Attorney, Agent, or Firm*—Oblon, Spivak, McClelland, Maier & Neustadt, P.C.

[57] ABSTRACT

Polyvinylbutyral useful for the production of laminated glasses containing a crosslinking agent capable of making the polyvinylbutyral very slightly meltable or nonmeltable. The material according to the invention may contain a plasticizer and is particularly resistant to fire and allows one to produce a laminated material with a good resistance to impact and to fire.

7 Claims, 1 Drawing Sheet

INTERMEDIATE FIRE-RESISTANT FILM AND ITS USE IN A LAMINATED GLASS

BACKGROUND OF THE INVENTION

Field of the Invention

The present invention relates to an intermediate fire-resistant film and to its use in an article of manufacture such as a laminated material, particularly in a laminated glass.

Laminated glasses are ordinarily used in buildings and in means of transport as glazings having "safety protection" characteristics, allowing one to reduce the likelihood of disasters due to impact. The simplest and most well known of these laminated glasses consist of two or more sheets of glass stuck together by one or more intermediate films of plasticized polyvinylbutyral (PVB). While such structures are effective against impacts, they are insufficient as regards safety protection in case of fire. While shattering or collapse of the glass is always considered first in this type of situation, the actual foremost problem with these laminated glasses comes from the intermediate film of plasticized PVB, which becomes soft and melts much more rapidly than the glass, and which thereby, when there is a shattering of the glass, very soon ceases to maintain the pieces of glass by adhesion. The melted plasticized PVB then flows outside the glazing before catching fire with the extensive release of heat and smoke, well before the beginning of softening of the glass. The rapid softening of the plasticized PVB, the flow of the burning PVB, the release of smoke, and ignition of the plasticized PVB constitute dangers that must be remedied in this type of glazing before all else.

It is appropriate to note, in fact, that the majority of currently existing laminated glasses capable of resisting fire do not have the simple and economical structure mentioned above and are consequently free of the problems connected with this structure. Depending on the case, these fireproofing laminated glasses use intermediate films other than plasticized PVB or use additional intermediate elements, with these other films or elements having and/or giving the glass the desired fire resistance properties.

Among known fire-resistant laminated glasses containing intermediate films other than plasticized PVB are laminated glasses containing two or more sheets of glass assembled together by an intermediary gel or silicone film. French Patent No. 2,346,548 describes a fireproofing laminated glass in which the intermediate film is a gel containing a liquid with a high heat of vaporization, such as water, and a substance capable of forming an insulating foam under the effect of thermal radiation. This glass, designed so as to meet the largest number of fire resistance criteria and consequently classified in the "insulating fire-retarding elements," nevertheless has a lower resistance to freezing and to impacts than a traditional laminated glass using an intermediate film of plasticized PVB; its thickness is also greater.

Another example of a glass with particularly good fireproofing properties is described in French Patent No. 2,394,394 describing a laminated glass containing two sheets of glass between which is an intermediate film of a silicone elastomer. The major disadvantage of this product is its extremely high price in comparison with the price of a traditional laminated glass using an intermediate film of plasticized PVB.

Several laminated glasses using intermediate films of PVB as well as additional intermediate elements that have and/or give said glasses fire resistance properties are also available. U.S. Pat. No. 5,219,630 describes a glazing that has an intermediate film, which can be a PVB film, in which a network of metallic wires is inserted for the purpose of retarding the collapse of the intermediate film and the glazing. However, besides the fact that such a network is visible, a means of this type does not really slow down the melting of the intermediate material and does not prevent its final flow or ignition starting from a certain temperature. Laminated glasses in which layers of material functioning as a thermal insulator in case of fire are inserted between each surface of the intermediate PVB film and the adjacent sheets of glass are also described in patents such as U.S. Pat. No. 4,071,649. Such an intermediate film structure with three distinct layers is nevertheless more complex than a single intermediate film of plasticized PVB and also leads to thicker glazings. This structure also does not prevent the final flow of the PVB or its ignition, even if it does retard the completion of these two events.

A last example of a currently existing laminated glass capable of resisting fire, which cannot really be classified in one or the other of the two aforementioned categories (intermediate film other than PVB—additional intermediate elements), is given in the European Patent No. 227,633. This patent proposes mixing, with the PVB used to produce the intermediate film of a laminated glass, a nonnegligible quantity of a particular plasticizing mixture composed of various additives with different functions, so as to obtain an intermediate film of plasticized PVB having a modified composition capable of reacting, in case of fire, in order to resist the fire. The mixture of additives added to the PVB in this patent is complex, however, and obliges one to produce a particular plasticized PVB for the production of a laminated glass with resistance to fire.

In a general way, it is appropriate to note that the existing laminated glasses designed for resisting fire have more complex structures and/or are more costly (because they require in particular the development of special intermediate films with a specific composition or containing several layers) than the traditional laminated glasses using ordinary intermediate films of plasticized PVB. Furthermore, their impact resistance properties are often worse than those of said traditional laminated glasses.

OBJECTS OF THE PRESENT INVENTION

One objective of the present invention is therefore to find a simple and economical solution to the problem of flow of intermediate films of plasticized PVB outside of laminated glasses, particularly laminated glazings, in case of a significant temperature rise, so as to provide laminated glasses, particularly glazings, that are simple and economical and have both a suitable resistance to impact and improved resistance to fire, with these laminated glasses additionally allowing for the maximum transmission of light in their usual lighting function.

Another object of the present invention is to develop a transparent intermediate film that is resistant to fire and whose base composition is a traditional plasticized PVB composition, with it being possible to obtain this intermediate film from ordinary plasticized PVB intermediate films and with it being possible to use this intermediate film according to the usual processes and advantageously in the production of laminated materials, particularly laminated glasses mentioned above.

DETAILED DESCRIPTION OF THE PRESENT INVENTION

Figure 1:
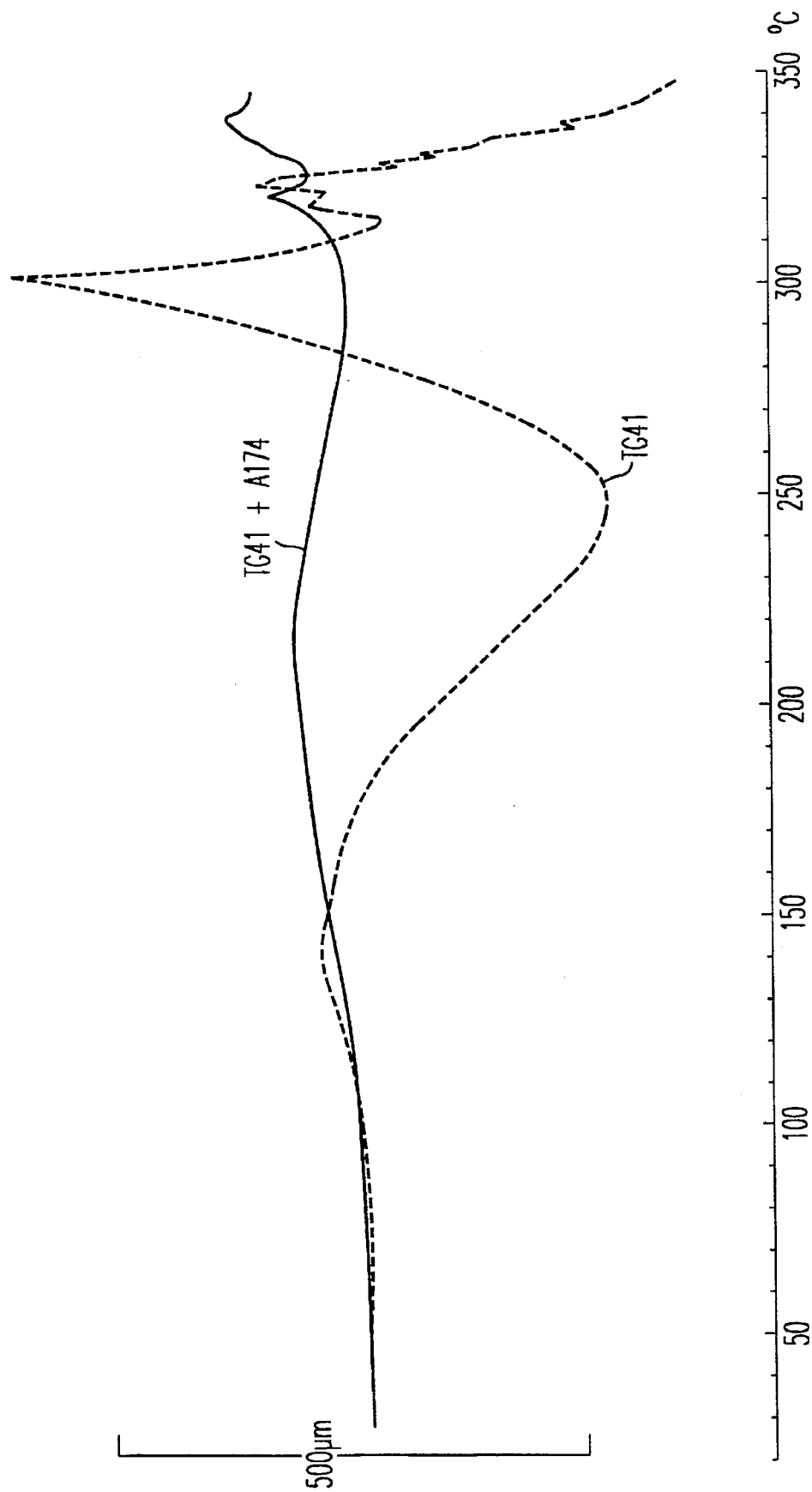
FIG. 1 shows thermograms of an intermediate film according to the invention and according to a comparative current intermediate film.

The above objects are provided by an intermediate film of plasticized polyvinylbutyral containing a crosslinking agent capable of making the plasticized polyvinylbutyral very slightly meltable or nonmeltable. Laminated materials, particularly laminated glasses, that contain at least two stiff sheets of inorganic material and at least one organic intermediate film of the invention are also provided as well as processes for the manufacture of an invention PVB film and of laminated materials mentioned above.

"Crosslinking agent capable of making the plasticized PVB very slightly meltable or nonmeltable" is used herein to mean a compound that under certain conditions (particularly under the effect of heat, as will be explained later) allows for the creation of enough bonds within the plasticized PVB to make it very slightly meltable or nonmeltable, particularly by limiting the freedom of the PVB chains and thus preventing its flow at high temperatures. "Creation of bonds within the plasticized PVB" is used herein to mean, among other things, the creation of bridge bonds (intermolecular) between the chains of PVB (so-called crosslinking bonds) and/or the formation of a tangle of interpenetrated polymer networks particularly following the polymerization of the crosslinking agent within the plasticized PVB.

"Plasticized PVB that is very slightly meltable or nonmeltable" is used herein to mean a plasticized PVB that does not flow or run regardless of the temperature. Such a PVB is possibly capable of softening (very slightly meltable plasticized PVB) without, however, becoming sufficiently liquid to run.

The intermediate film of the invention, within which the plasticized PVB has been made very slightly meltable or nonmeltable following the action of the crosslinking agent, has greatly increased fire resistance. Its possible softening, after the action of the crosslinking agent on the plasticized PVB, occurs at temperatures much higher than the softening temperatures of plasticized PVB films traditionally used (with these last temperatures generally being less than approximately 150° C.); moreover, the invention film of plasticized PVB which can be used in laminated materials, when made very slightly meltable or nonmeltable does not flow nor ignite, but keeps its integrity before decomposing, with its decomposition occurring at temperatures higher than 250° C., generally higher than 300° C. Furthermore, the use, in laminated glasses, of the invention intermediate films of plasticized PVB made very slightly meltable or nonmeltable by the action of the crosslinking agent, does not keep one from obtaining transparent laminated glasses with good optical qualities and with impact resistance properties of said laminated glasses being as satisfactory as the impact resistance properties of laminated glasses using ordinary intermediate films of plasticized PVB.

Preferably, the crosslinking agent present in the invention intermediate film contains at least two groups capable of reacting with the hydroxyl groups of PVB and/or it is capable of forming an interpenetrated network with the plasticized PVB, particularly by polymerizing. This crosslinking agent is chosen so as to react within the intermediate film under the effect of heat and/or of a catalyst that may also be present in the intermediate film, or possibly under the effect of a treatment other than a thermal one. Preferably, the crosslinking agent is chosen so as to react, under the action of heat, with the plasticized PVB in order to make it very slightly meltable or nonmeltable, starting at temperatures between 100° C. and the temperature at which the plasticized PVB used is capable of running (with plasticized PVB generally beginning to run starting at 180° C.), and advantageously starting at temperatures between the softening temperature of the plasticized PVB alone or a slightly lower temperature (for example, 120° C. for a softening temperature of 140° C.) and the temperature at which the plasticized PVB alone begins to run, preferably starting at temperatures between approximately 120° and 170° C.

The choice of a crosslinking agent that reacts with the plasticized PVB starting at temperatures between the softening temperature of the plasticized PVB or a slightly lower temperature and the temperature at which it begins to run offers several advantages with regard to the process for producing the intermediate film according to the invention and the process for producing the laminated materials from this film, as will be explained later. The intermediate film containing said agent particularly has the advantage of maintaining its integrity (that is to say, of not running) for any temperature lower than its decomposition temperature.

According to a particularly advantageous form of execution of the invention, the intermediate film contains, as a crosslinking agent, at least one hydrolyzable alkoxysilane with at least two reactive groups, and preferably at least one dialkoxysilane and/or trialkoxysilane and/or tetraalkoxysilane. The dialkoxysilanes and trialkoxysilanes are normally used as coupling agents in order to promote adhesion of the glass and the polymers, because they generally react both with the surface of the glass and with such polymers. However, PVB has hydroxyl groups that react directly with the surface of the glass and it does not require the use of such agents for sufficient adhesion to the glass placed in contact with it. The plasticized PVB is thus traditionally used as intermediate film in the laminated glasses without the addition of alkoxysilanes.

In the present invention it is believed that the addition of alkoxysilanes as described above does not necessarily lead to an improvement of adhesion between the glass and the plasticized PVB, but leads to the creation of bonds within the PVB (rather than on the surface), which allows one to, in fact, make the PVB nonmeltable or very slightly meltable; the hydroxyl groups of the PVB not used for the adhesion of the PVB can serve as attachment points for bridging with said alkoxysilanes; said alkoxysilanes can be hydrolyzed in order to form polysiloxanes that blend with the chains of plasticized PVB so as to form an interpenetrated network.

Hydrolyzable alkoxysilanes with at least two reactive groups which can be used as a crosslinking agent according to the invention can consist of any type of alkoxysilanes, particularly aminosilanes, epoxysilanes, vinylsilanes, phenylsilanes, alkylsilanes, etc., and mixtures thereof with 2 or 3 identical or different alkoxy groups, such as methoxy, ethoxy, methacryloxy, glycidoxy groups etc., or can consist of modified silanes with one or more groups such as phosphorus or bromine and having 2 or 3 identical or different alkoxy groups such as those mentioned above, or can consist of silanes with 4 identical or different alkoxy groups such as those mentioned above.

According to other embodiments of the invention, the intermediate film can contain, as a crosslinking agent, amines, blocked isocyanates or epoxy compounds, with these agents being less advantageous and less easy to implement.

The intermediate film according to the invention can be produced in different ways. The crosslinking agent, which is an agent outside the PVB that is capable of reacting with the PVB already synthesized, is to be distinguished from the components used for the synthesis of the PVB and is added most simply and advantageously to ordinary PVB that is already synthesized. Preferably, the crosslinking agent is deposited on the surface of a film of plasticized PVB produced according to methods known to those of ordinary skill in the art, including extrusion, pressing, etc.

Thus, according to a particularly advantageous embodiment of the intermediate film according to the invention, an intermediate film made of ordinary plasticized PVB is simply dipped in a bath of crosslinking agent according to the invention, with this agent being pure or diluted in a suitable solvent. For example, when the crosslinking agent consists of one or more alkoxysilanes, these alkoxysilanes can be used pure or diluted in an alcohol, for example, isopropanol or methanol, in a water-alcohol mixture, for example, a water-isopropanol mixture, or in another solvent that is not a solvent of PVB, for example, an alkane such as heptane, octane, etc. They can also be hydrolyzed before being put in contact with the PVB so as to prevent the release of troublesome products during the addition of said alkoxysilanes to the PVB, and also so as to make the alkoxysilanes more reactive. A very short dipping time, for example, on the order of 1 sec to 2 min for pure or diluted alkoxysilanes, is generally sufficient for obtaining an intermediate film according to the invention.

Another embodiment according to the invention includes depositing, by spraying, a light mist of pure or diluted crosslinking agent on the surface of an intermediate film made of ordinary plasticized PVB. According to a third embodiment of the present invention, it is also possible to impregnate the surface of an intermediate film made of ordinary plasticized PVB with a roller, with the impregnation solution consisting of the pure or diluted crosslinking agent. It is thus possible, as illustrated by the embodiments mentioned above, to produce intermediate films according to the invention simply from already existing films of plasticized PVB, by treating the surface of said films. This is an important advantage.

According to the invention the addition of the crosslinking agent to the PVB can also be done before the formation of the intermediate film containing said PVB, with this embodiment being less advantageous. Thus, the intermediate films according to the invention can be obtained by the introduction of the crosslinking agent into either already plasticized PVB powder or simultaneously with or before the addition of plasticizers to the PVB, before the transformation of said PVB into an intermediate film by extrusion, molding, etc. according to processes known in the art. In this embodiment, the transformation conditions are controlled (for example, the temperature or kneading level in the case of extrusion, etc.), and the crosslinking agent is chosen so that it does not react with the plasticized PVB under the transformation conditions used. In this case, it is advantageous to choose a crosslinking agent that reacts with the plasticized PVB at temperatures higher than the softening temperature of the plasticized PVB under any pressure conditions used and particularly higher than the temperature of extrusion or pressing, or to choose a crosslinking agent that reacts starting at slightly lower temperatures without the reaction's being sufficient at these temperatures to make the PVB nonmeltable or very slightly meltable, so as to allow for the melting or remelting of the plasticized PVB for its extrusion or pressing in order to obtain the desired intermediate film.

It is appropriate to note that the presence or the addition of plasticizers to the PVB—with these plasticizers in particular being those used traditionally to "soften" the PVB, for example, adipates, sebacates, phthalates, or being phosphates, etc., with these plasticizers not having any residual hydroxyl groups—normally has no influence on the reactions occurring in the PVB because of the presence of the crosslinking agent. When used, plasticizer(s) are typically present in amounts of 10–40 wt. % based on the film of plasticized polyvinylbutyral.

The embodiments of the intermediate film according to the invention presented above are of course not exhaustive. Other methods of putting the crosslinking agent in contact with the PVB used to make the intermediate films according to the invention can be considered and are part of the present invention.

The intermediate films according to the invention allow for the production of articles of manufacture such as laminated materials, particularly laminated glasses, which were previously explained in the definition of the invention. Laminated glasses contain at least two sheets of glass and at least one intermediate film made of plasticized PVB according to the invention. The laminated materials can also contain several intermediate films according to the invention and/or other intermediate films, made of PVB or not, as are normally used in laminated materials, and/or can contain at least one sheet of inorganic material made of a substance other than glass, for example, made of natural stone such as marble, granite, a reconstituted material, etc. The laminated materials according to the invention, as illustrated hereafter, have an increased resistance to fire in comparison with the laminated materials using traditional intermediate films of plasticized PVB, as well as a resistance to impact that is similar to that of said traditional laminated materials. They are generally capable of resisting temperatures ranging up to approximately 600° C. without the flow of the intermediate film-outside the laminated material and before the decomposition of said film. Furthermore, the laminated glasses according to the invention are simple and economical and allow for a good transmission of light.

Preferably, the crosslinking agent is chosen so as to react with the plasticized PVB at temperatures higher than the softening temperature of the plasticized PVB and particularly higher than the usual temperatures for assembling plasticized PVB and sheets of inorganic materials in order to produce a laminated material, or starting at slightly lower temperatures without the reaction's being sufficient at these temperatures to make the plasticized PVB very slightly meltable or nonmeltable, so as to allow for the implementation of the intermediate films in articles of manufacture including laminated materials according the usual processes. The assembling of the intermediate film and the sheet or sheets of inorganic material according to the invention, in order to result in laminated materials according to the invention, can then be done with a softened intermediate film of plasticized PVB whose structure has not yet been modified by the crosslinking agent, under the same conditions as in the assembling of an identical film of plasticized PVB without a crosslinking agent. The adhesion of the PVB to the sheets in contact with it is thus thought to occur in the traditional way by surface hydroxyl groups of the PVB film; the film maintains the same properties as an ordinary plasticized PVB film, as desired in such applications, while the reaction of the crosslinking agent with the plasticized PVB has not taken place completely (that is to say, has not made the PVB nonmeltable or very slightly meltable).

Therefore, in the process for the production of a laminated material according to the invention, the intermediate film is preferably assembled with the sheets (i.e., substrates) of inorganic material (including glass) under typical assembling conditions (temperatures generally on the order of 140° C.) and before the plasticized PVB is made very slightly meltable or nonmeltable by the action of the crosslinking agent; the action of the crosslinking agent on the plasticized PVB can be triggered at the earliest during the assembling of the intermediate film and the stiff sheets under the effect of heat, for example, or can be triggered later, particularly during a fire.

Other characteristics and advantages of the invention will appear in the following examples illustrating the present invention without limiting it, and which give results obtained in the matter of fire resistance using an intermediate film according to the invention. The results obtained using a traditional intermediate film are illustrated in parallel in the comparative example. The attached FIG. 1 compares, as explained later, the thermograms recorded in the case of an intermediate film according to the invention and in the case of a traditional intermediate film. All parts are parts by weight unless otherwise specified.

EXAMPLE 1

According to this example, an intermediate film made of plasticized PVB with 33 parts per 100 of dihexyl adipate resin, marketed under the trade name "Saflex TG 41" by the Monsanto company and with an approximate thickness of 760 μm, is immersed in a bath of gamma-methacryloxypropyltrimethoxysilane, pure or diluted to 50% in heptane, for 10 sec to 2 min, in order to obtain an intermediate film of plasticized PVB according to the invention. The intermediate film obtained is then dried by the blowing of cold dry air or in an oven at 50° C.

The intermediate film thus produced is subjected to thermomechanical analysis consisting of monitoring the sinking of a point in said intermediate film as a function of the temperature. Such an analysis allows one to verify whether a polymer is meltable, the thermogram recorded in the course of this analysis allowing one to determine the softening or melting temperature of said polymer.

The intermediate film according to this example maintains its integrity up to temperatures higher than 300° C. before decomposing in the vicinity of 330° C. The corresponding thermogram is represented as a solid line in the attached FIG. 1 and shows, after a slight expansion of the film, a type of softening of the film around 300° C. just before its decomposition. The gamma-methacryloxypropyltrimethoxysilane used is marketed under the trade name "A 174" by the Union Carbide company.

EXAMPLE 2

According to this example, an intermediate film of plasticized PVB is produced in the same way as in Example 1, this time dipping the intermediate film of plasticized PVB in a bath of gamma-glycidoxypropyltrimethoxysilane marketed under the trade name "A 187" by the Union Carbide company.

The intermediate film according to the present example is characterized by a decomposition temperature higher than 300° C., with said film maintaining its integrity up to its decomposition temperature.

EXAMPLE 3

According to this example, an intermediate film of plasticized PVB is produced in the same way as in Example 1, this time spraying a light mist of vinyltrimethoxyethoxysilane on an intermediate film of plasticized PVB, then spreading the deposited mist with a cloth.

The intermediate film according to the present example is characterized by a decomposition temperature higher than 300° C., with said film maintaining its integrity up to its decomposition temperature.

EXAMPLE 4

According to this example, an intermediate film of plasticized PVB is produced in the same way as in Example 1, this time dipping the intermediate film of plasticized PVB in a bath of aminopropyltriethoxysilane.

The intermediate film according to the present example is characterized by a decomposition temperature higher than 300° C., with said film maintaining its integrity up to its decomposition temperature.

EXAMPLE 5

According to this example, an intermediate film of plasticized PVB is produced in the same way as in Example 1, this time spraying a light mist of trimethoxysilyldiaminophenylhexyl (silane) on an intermediate film of plasticized PVB, then spreading the deposited mist with a cloth.

The intermediate film according to the present example is characterized by a decomposition temperature higher than 300° C., with said film maintaining its integrity up to its decomposition temperature.

The intermediate film according to this example is used to produce a laminated glass according to a traditional process, with the laminated glass containing two sheets of glass between which said film is found, and with the gluing of the intermediate film on the glass being done during the treatment of the laminated glass in an autoclave with heat and under pressure. The laminated glass thus obtained is placed in a furnace at 600° C., then its changes as a function of the temperature are monitored. Starting at 200° C., bubbles appear in the laminated glass without any rupture of the sheets of glass and without flow of the intermediate film. Starting at 450° C., the intermediate film at the periphery of the laminated material in contact with the atmosphere of the furnace yellows and blackens but does not ignite. After 1 h at 600° C., the intermediate film begins to disappear little by little from the periphery of the laminated material, causing no extensive release of smoke or run-out while leaving a fine white layer of silica on the adjacent sheets of glass.

It is appropriate to note that the laminated glass obtained in this example, just as the laminated glasses obtained in an identical manner from the intermediate films in examples 1 to 4, has similar mechanical properties to those of a traditional laminated glass obtained in an identical manner from an intermediate plasticized PVB film as described in the comparative example. Furthermore, the reaction of the alkoxysilanes with the PVB does not disturb the manufacture of the laminated materials, with this reaction being triggered at the earliest during such manufacture and not being completed before the end of this manufacturing.

Comparative Example

According to this example, an intermediate film of plasticized PVB with 33 parts per 100 of dihexyl adipate resin, marketed under the trade name "Saflex TG 41" by the Monsanto company and with an approximate thickness of 760 μm is subjected to thermomechanical analysis. This film is characterized by a softening temperature of about 150° C.

One observes that small bubbles appear under the effect of heat, covering all of the surface of the film, and that white smoke is released. This release is possibly followed by swelling of the product before yellowing, then ignition of said product before 250° C. with an extensive release of black smoke and heat. The corresponding thermogram is represented by the dotted line in FIG. 1.

The intermediate film according to this example is then used to produce a laminated glass in the same manner as in Example 5; the laminated glass obtained is then placed in a furnace at 600° C. and its changes as a function of the temperature are monitored. At 180°–200° C., the intermediate film flows outside the laminated material, in which a large quantity of bubbles appear. The intermediate film yellows intensely, blackens, and ignites with a great release of heat and smoke.

The preceding examples thus show the improved fire resistance of the intermediate films made according to the invention. These intermediate films can be advantageously used in the production of laminated glasses with no fear in particular of the flow of said films in case of fire. It is also suitable to emphasize that the present invention constitutes, as desired, a simple and economical solution to the problem of the flow of intermediate films made of plasticized PVB outside of glasses, particularly and advantageously of already existing and commercially available intermediate films of plasticized PVB, by proposing intermediate films that can be produced directly from said already existing intermediate films.

The intermediate films according to the invention, particularly films with a thickness of 0.38 mm or 0.76 mm, can be advantageously used in the production of laminated glasses for buildings or laminated glasses for transport vehicles. Films according to the invention may, of course, have any desired thickness. Preferred thicknesses include 0.01–5 mm, including all values and all ranges therebetween. These films may be adhered to a single substrate or between two substrates, etc. Preferred substrates are glass panes. The thickness of the substrates is not limited, nor is their shape. Planar substrates and those with slight curves as in windshields are preferred. The polyvinylbutyral/crosslinker composition according to the invention need not contain plasticizer, and need not be in the form of a film.

This application is based on French Application 94 06772 filed Jun. 2, 1994, incorporated herein by reference.

What is claimed as new and is desired to be secured by Letters Patent of the United States is:

1. An article of manufacture comprising at least two substrates made of inorganic material and at least one intermediate film of plasticized polyvinylbutyral, wherein said plasticized polyvinylbutyral does not flow or run regardless of temperature.

2. A process for manufacturing an article, comprising at least two substrates made of inorganic material and at least one intermediate film of plasticized polyvinylbutyral which does not flow or run regardless of temperature, wherein the at least one intermediate film is assembled between the substrates of inorganic material and the polyvinylbutyral is made not to flow or run regardless of temperature by the action of a crosslinking agent.

3. The process according to claim 2, wherein the crosslinking agent contains at least two functional groups capable of reacting with hydroxyl groups of the polyvinylbutyral and/or capable of forming an interpenetrated network with the plasticized polyvinylbutyral.

4. The process according to claim 3, wherein the crosslinking agent is selected from the group consisting of alkoxysilanes, amines, blocked isocyanates, and epoxy compounds.

5. The article according to claim 1, wherein said plasticized polyvinylbutyral decomposes at temperatures higher than about 250° C.

6. An article according to claim 1, which resists temperatures ranging up to approximately 600° C. without flow of the intermediate film outside of the article and before decomposition of said intermediate film.

7. A process according to claim 2, wherein the action of the crosslinking agent on the plasticized polyvinylbutyral is triggered by heat either during or after the assembling of the intermediate film and the substrates of inorganic material.

* * * * *